(12) United States Patent
Gavin

(10) Patent No.: US 12,151,731 B2
(45) Date of Patent: Nov. 26, 2024

(54) POWERED BEACH WAGON

(71) Applicant: John Tanner Gavin, Kissimmee, FL (US)

(72) Inventor: John Tanner Gavin, Kissimmee, FL (US)

(*) Notice: Subject to any disclaimer, the term of this patent is extended or adjusted under 35 U.S.C. 154(b) by 648 days.

(21) Appl. No.: 17/474,235

(22) Filed: Sep. 14, 2021

(65) Prior Publication Data

US 2022/0089207 A1    Mar. 24, 2022

Related U.S. Application Data

(60) Provisional application No. 63/081,913, filed on Sep. 23, 2020.

(51) Int. Cl.
*B62B 5/00* (2006.01)
*B62B 3/02* (2006.01)

(52) U.S. Cl.
CPC .............. *B62B 5/0046* (2013.01); *B62B 3/02* (2013.01); *B62B 2202/52* (2013.01)

(58) Field of Classification Search
CPC ...... B62B 5/0046; B62B 3/02; B62B 2202/52
See application file for complete search history.

(56) References Cited

U.S. PATENT DOCUMENTS

| 7,210,545 | B1* | 5/2007 | Waid | B62B 3/12 |
| | | | | 180/19.1 |
| 7,762,363 | B1* | 7/2010 | Hirschfeld | B60K 1/04 |
| | | | | 280/651 |
| 7,963,530 | B1* | 6/2011 | Garcia | B62B 3/02 |
| | | | | 280/30 |
| 8,286,739 | B2* | 10/2012 | Oliphant | H01M 10/44 |
| | | | | 180/65.1 |
| 8,453,771 | B1* | 6/2013 | Hirschfeld | B60L 8/003 |
| | | | | 180/19.1 |
| 8,511,406 | B2* | 8/2013 | Anasiewicz | B62B 3/02 |
| | | | | 180/65.6 |
| 8,596,389 | B2* | 12/2013 | Anasiewicz | B62D 51/04 |
| | | | | 180/65.6 |
| 8,746,377 | B1* | 6/2014 | Dunbar | B62B 5/0003 |
| | | | | 280/30 |
| 9,145,154 | B1* | 9/2015 | Horowitz | B62B 5/0013 |
| 9,661,905 | B2* | 5/2017 | O'Donnell | A45C 5/03 |

(Continued)

*Primary Examiner* — Kevin Hurley
*Assistant Examiner* — Michael R Stabley
(74) *Attorney, Agent, or Firm* — Jason T. Daniel, Esq.; Daniel Law Offices, P.A.

(57) ABSTRACT

A powered wagon for carrying items on sand for a user that has a foldable frame assembly and foldable, fabric container assembly with an open top portion. The wagon includes a front two-wheel frame assembly and back two-wheel frame assembly, with the back two-wheel frame assembly being inwardly and outwardly slidable along a back support bar and designed to nest between the front two-wheel frame assembly when the foldable frame assembly is retracted. A handle and telescoping bar assembly is pivotally coupled substantially to a housing assembly on the bottom frame portion, a handle portion defining the proximal bar end. A motor and shaft assembly in the housing assembly is electrically coupled to a rechargeable battery assembly, an actuator assembly, and electronic controls which are communicatively coupled to a hand-held communication or smart device.

19 Claims, 7 Drawing Sheets

(56) References Cited

U.S. PATENT DOCUMENTS

| | | | |
|---|---|---|---|
| 9,771,093 B2* | 9/2017 | Horowitz | B62B 3/02 |
| 9,908,570 B1* | 3/2018 | Mayers | B62D 51/04 |
| 10,583,852 B2* | 3/2020 | Fitzwater | B62B 7/008 |
| 10,696,314 B1* | 6/2020 | Camarco | B62B 5/0003 |
| 11,014,592 B2* | 5/2021 | Zhu | B62B 5/06 |
| 11,414,114 B2* | 8/2022 | Kramer | B62B 5/067 |
| 2007/0080002 A1* | 4/2007 | Liao | B62B 5/0046 180/65.1 |
| 2008/0041644 A1* | 2/2008 | Tudek | B60L 7/12 180/65.1 |

* cited by examiner

POWERED BEACH WAGON

CLAIM OF PRIORITY

This application claims priority to and the benefit of US Provisional application with Ser. No. 63/081,913, and filed on Sep. 23, 2020, with the same title, which is herein incorporated by reference in its entirety.

FIELD OF THE INVENTION

The inventive concept relates generally to a beach wagon for porting your personal items.

BACKGROUND

Currently, there are a number of solutions for transporting items to the beach. One of these solutions is a bag, but this solution fails to meet the needs of the market because bags can become heavy. Another solution is a backpack, but this solution is similarly unable to meet the needs of the market because backpacks cannot carry many items before becoming too heavy. Still another solution seeks to use a standard wagon, but this solution also fails to meet market needs because standard wagons get bogged down in the sand and are usually too bulky and not collapsible to carry them around in your car. Therefore, there currently exists a need in the market for a wagon for carrying items on sand that transports personal items to the beach.

SUMMARY OF THE INVENTION

The inventive concept is a self-powered wagon for carrying items on sand or grass (or even snow for outings on a frozen lake or forest during winter use) for a user that has a foldable frame assembly with a bottom frame portion, a front frame portion, a back frame portion, and a laterally extendable and retractable right and left sidewall portion. In one example embodiment, there is included a foldable, fabric container assembly that has a base portion, a front wall portion, a back wall portion, a right and left sidewall portion, and an open top portion. The foldable, fabric container assembly is removably coupled to the frame assembly and designed to laterally extend and retract with the frame assembly and to, when extended, take substantially a cuboid form. Coupling with the wagon and/or the fabric container assembly may occur with hook and loop assemblies, clips, pockets, ties, or other coupling assemblies. The wagon further includes a front and a back two-wheel frame assemblies formed from four wheel and axle assemblies that rest on a surface such as sand. The wheel portions of the wheel and axle assemblies are, optionally as desired sizes may vary, substantially seven or more inches in diameter and two or more inches wide. Four substantially U-shaped, wheel frames each encompass one of the wheels of the four wheel and axle assemblies, the upper half of each wheel disposed substantially within the corresponding U-shaped wheel frame. The front two-wheel frame assembly is coupled to the front base corners of the foldable frame assembly and is horizontally rotatable. A back two-wheel frame assembly is coupled to the back base corners of the foldable frame assembly and is designed to be inwardly and outwardly slidable along a back support bar of the bottom frame portion, the back two-wheel frame assembly being designed to nest between the front two wheels of the front two-wheel assembly when the foldable frame assembly is in a retracted state with the back two-wheel frame assembly inwardly disposed.

In this example embodiment, a handle and telescoping bar assembly is pivotally coupled substantially to a housing assembly by the distal end of the handle and bar assembly, the housing assembly horizontally being coupled to a front support bar member of the bottom frame portion. A horizontally disposed handle portion defines the proximal end of the handle and telescoping bar assembly. A motor and shaft assembly is contained within the housing assembly and is electrically coupled to a rechargeable battery assembly (power source) and an actuator assembly, the motor and shaft assembly rotationally coupled to the front two-wheel frame assembly at a right front wheel and axle assembly and a left front wheel and axle assembly of the four wheel and axle assemblies. An electronic control panel is communicatively coupled to a hand-held communication or smart device and designed for the user to remotely control the actuator assembly, speed of the motor and shaft assembly, and manual or automatic modes of operating the powered wagon.

In one embodiment of the powered wagon for carrying items on sand, a control button assembly is located on the horizontally disposed handle portion of the handle and telescoping bar assembly and designed, when activated by the user, to command the powered wagon to move forward. Forward is defined as the direction led by the front of the wagon. Wagon is defined as a low four-wheeled vehicle (or three wheels or two cylindrical rollers, one in front and one in back) with an open rectangular body design, but not necessarily limited to a rectangular shape and it can be a flat bed as well), the body designed to be pulled or having its own motor.

In one embodiment of the powered wagon for a user carrying items on sand or snow (for outings on a frozen lake or forest during winter use, preferably but other terrain is possible), a Bluetooth speaker assembly is included that is communicatively coupled to a receiver or transceiver assembly or radio, is disposed on the frame assembly or the fabric container assembly or located within the housing assembly.

In various embodiments of the powered wagon for carrying items on sand for a user, there is included one or more horizontally disposed ring or loop assemblies that are coupled to the front frame portion or back frame portion of the foldable frame assembly and are designed to support a vertically disposed pole assembly. The pole assembly may hold an umbrella, a cabana-like support pole or a corner of a tent-like canopy.

In one embodiment of the powered wagon for carrying items on sand for a user, a plurality of pocket members is disposed on the wall portions of the foldable, fabric assembly, one of which can serve as a security pocket or pouch for valuables when on the beach or when in the campground. In one example embodiment, a clear or transparent pocket on the outside of the wagon frame assembly or fabric container is used to insert a smart tablet or other smart device for viewing activities, such as news, sports, movies or shows for kids or for web conferencing such as Zoom or WebEx or Microsoft Teams.

It would be advantageous, to have a powered wagon for carrying items on sand that is portable, collapsible and lightweight. Furthermore, it would be advantageous to have a powered wagon for carrying items on sand that has Bluetooth capabilities and radio communication capabilities as well as GPS for tracking the wagon's location.

The inventive concept advantageously fills the aforementioned deficiencies by providing a beach wagon, which provides an easy way to carry items through the sand. A person of ordinary skill in the art would recognize that widening wheels allows the weight of the wagon to be dispersed over a wider surface area than a narrower wheel and would make the wider wheel less prone to sinking in the sand when bearing comparable weight. The wheels may be rubber inflated beach tires or a harder plastic and may have deep treads or have a substantially smooth surface.

The powered wagon for carrying items on sand may have a Bluetooth-capable handle and configured for carrying items on sand may have four sand tires. The powered wagon for carrying items on sand fulfills the need for a personal item carrier for the beach, another sandy environment, or on other loose substances such as snow or rocks or gravel.

Among other things, it is an advantage of the inventive concept to provide a beach wagon that does not suffer from problems or deficiencies associated with prior solutions.

It is still further an advantage of the powered wagon for carrying items on sand tube collapsible. Still further, the powered wagon for carrying items on sand may have a telescopic handle.

The inventive concept now will be described more fully hereinafter with reference to the accompanying drawings, which are intended to be read in conjunction with both this summary, the detailed description and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

DETAILED DESCRIPTION OF THE INVENTION

Figure 1:
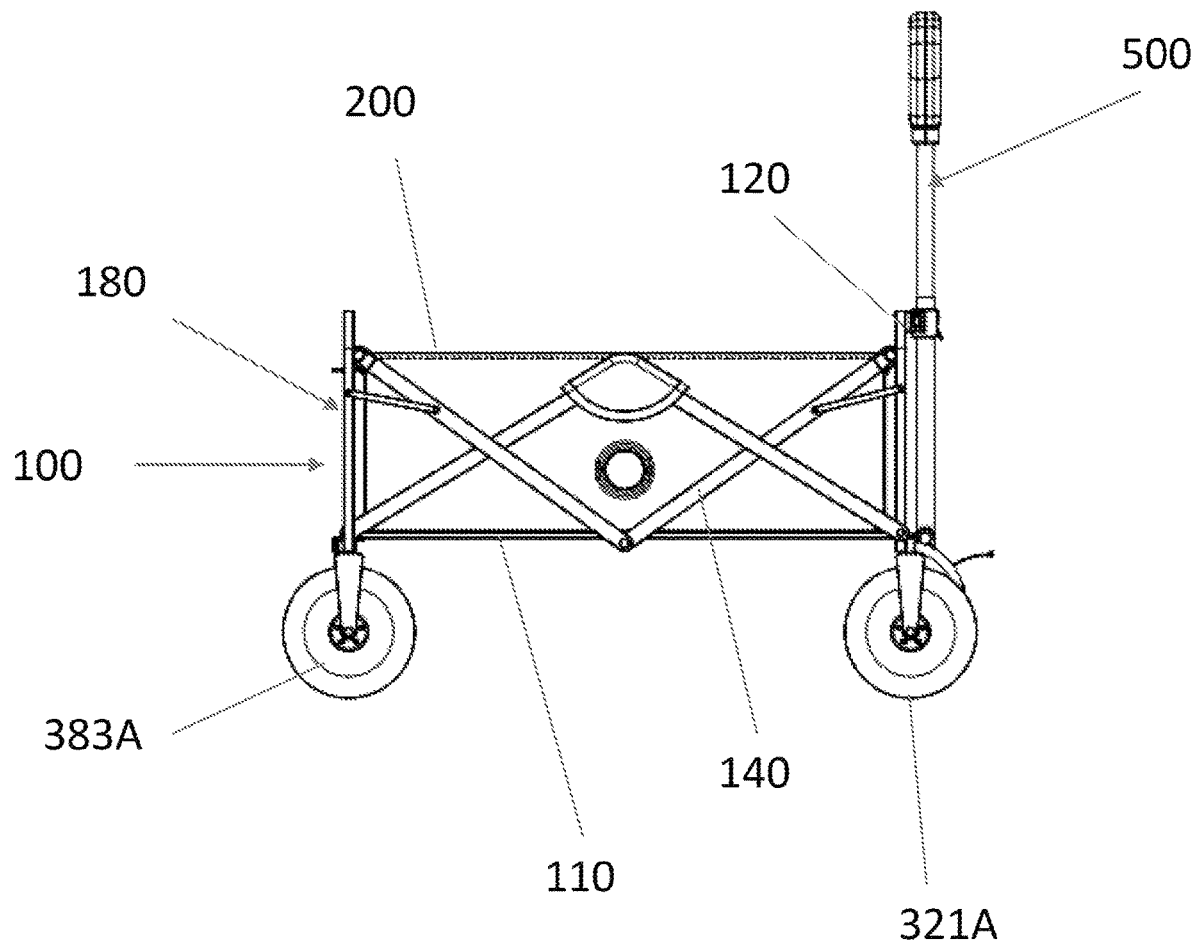
FIG. 1 illustrates a left side view of the powered wagon for carrying items on sand.
Figure 2:
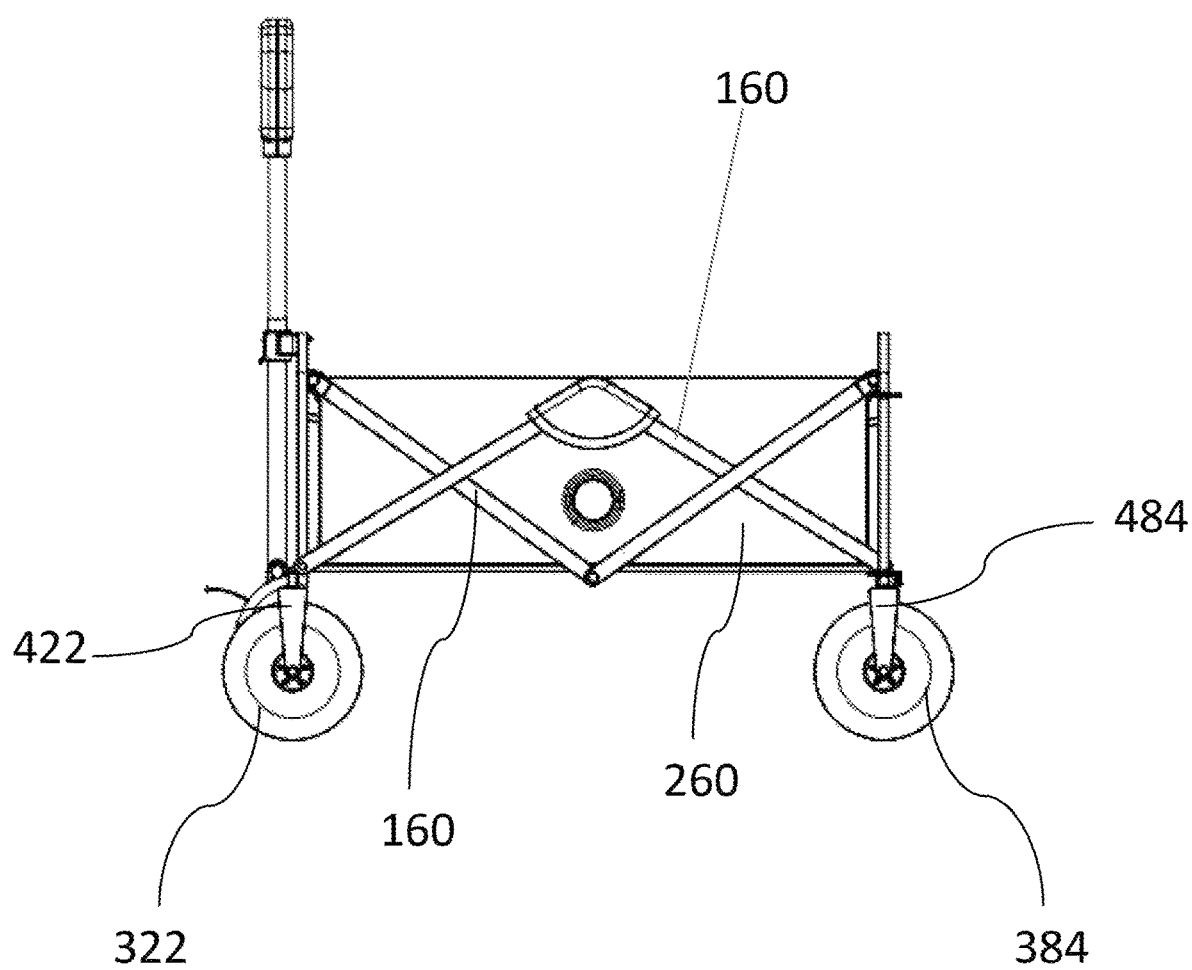
FIG. 2 illustrates a right side view of the powered wagon for carrying items on sand.

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Referring to the figures, FIGS. 1-7 illustrate the inventive concept as a powered wagon 10 for carrying items on sand for a user that includes a foldable frame assembly 100 with a bottom frame portion 110, a front frame portion 120, a back frame portion 180, and a laterally extendable and retractable (scissor-like) right sidewall hinged portion 140 and left sidewall hinged portion 160. A foldable, fabric container assembly 200 has a base portion 210, a front wall portion 220, a back wall portion 280, a right sidewall portion 240 and left sidewall portion 260, and an open top portion 290. In this example embodiment, the foldable, fabric container assembly 200 is removably coupled to the frame assembly 100 and designed to laterally extend and retract with the frame assembly 100 and to, when extended, take substantially a cuboid form. Four wheel and axle assemblies 321, 322, 383, 384 are included that are, but not necessarily limited to, wheels substantially seven or more inches in diameter, and two or more inches wide where the wheel and axle assemblies rest on a surface. Four substantially U-shaped, wheel frame assemblies 421, 422, 483, 484 each encompass one of the four wheel and axle assemblies 321, 322, 383, 384, the upper half of each wheel and axle assembly 321, 322, 383, 384 disposed substantially within the corresponding wheel frame assembly 421, 422, 483, 484.

The front two-wheel frame assembly 420 comprised of assemblies 421, 422 and of the four wheel frame assemblies 421, 422, 483, 484 are coupled to a front right and left base corners 111A/112A of the foldable frame assembly 111, 112, the front two-wheel frame assembly 420 of assemblies 421, 422 at least partly horizontally rotatable. The back two-wheel frame assembly 480 of assemblies 483, 484 of the four wheel frame assemblies 421, 422, 483, 484 are coupled to the back base corners 113A/114A of the foldable frame assembly 113, 114, the back two wheel frame assemblies 483, 484 inwardly and outwardly slidable along a back support bar 185 of the bottom frame portion 110, the back two-wheel frame assembly 480 of assemblies 483, 484 designed to nest between the front two-wheel frame assembly 420 of assemblies 421, 422 when the foldable frame assembly 100 is in a retracted state with the back two-wheel frame assembly 420 of assemblies 421, 422 inwardly disposed. In one example embodiment, there is included at least one wheel lock assembly located on any one of the front two-wheel frame assembly or the back two-wheel frame assembly to secure wagon 10 in place.

Figure 3:
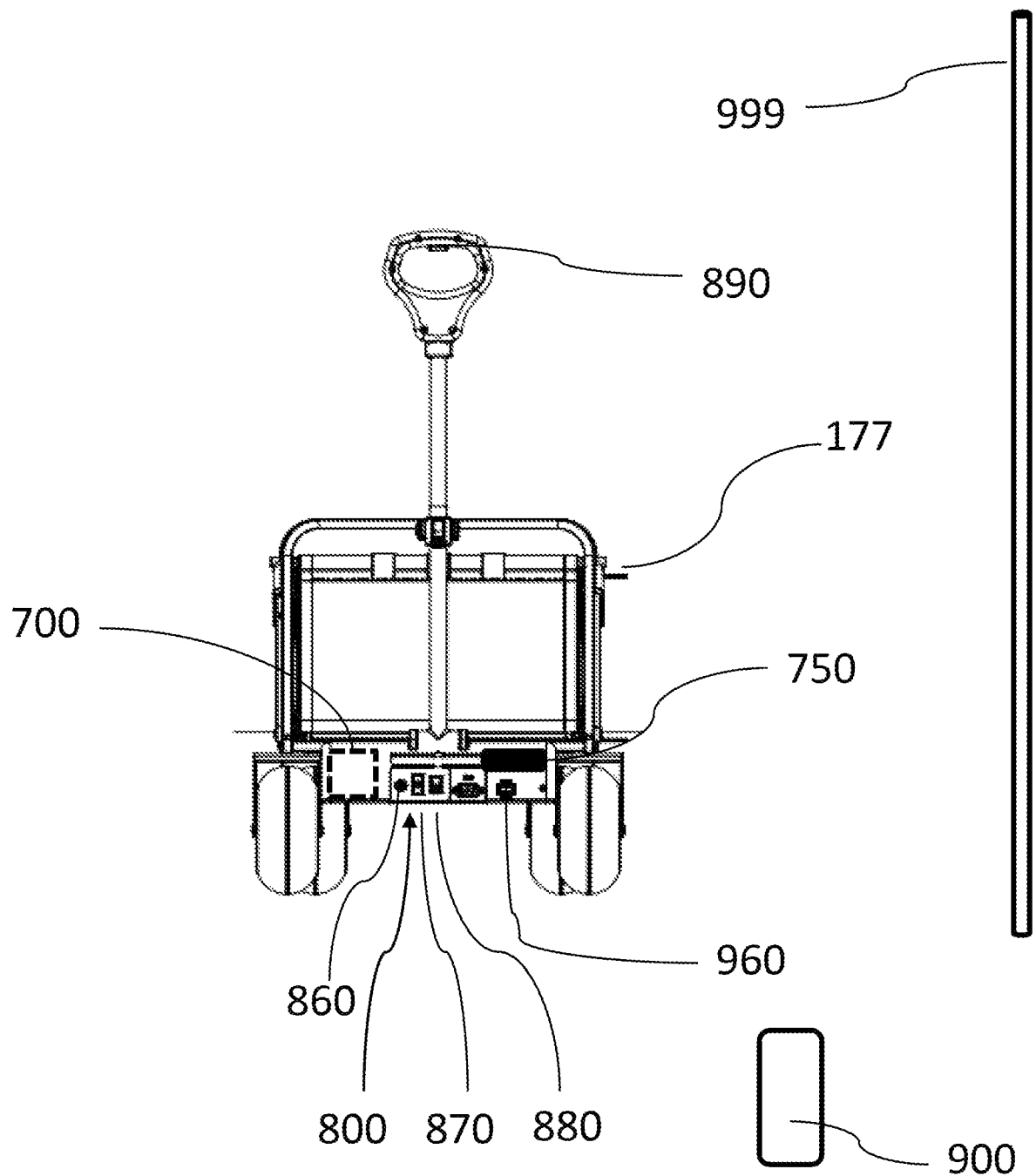
FIG. 3 illustrates a front view of the powered wagon for carrying items on sand.
Figure 4:
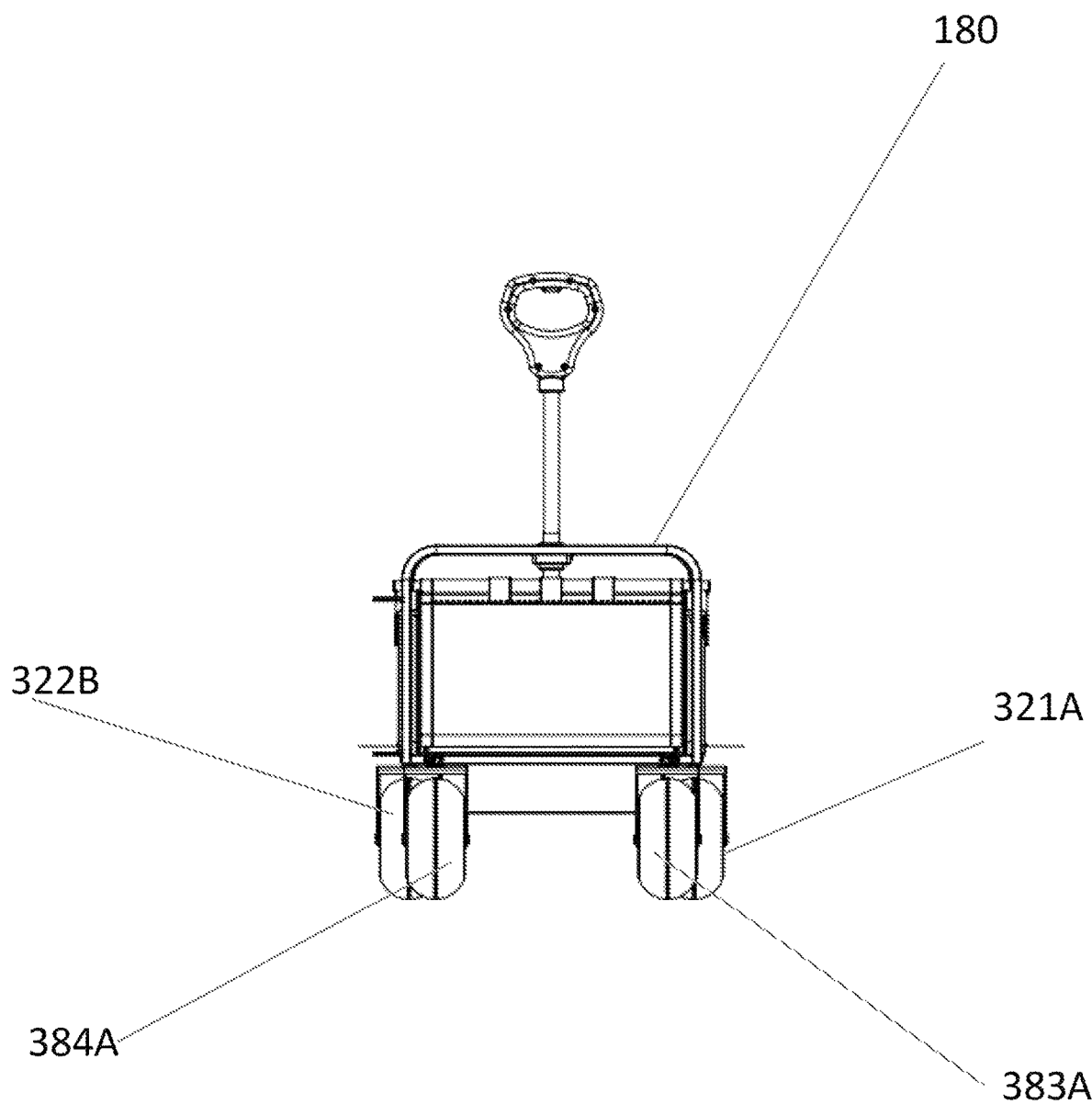
FIG. 4 illustrates a back view of the powered wagon for carrying items on sand.
Figure 5:
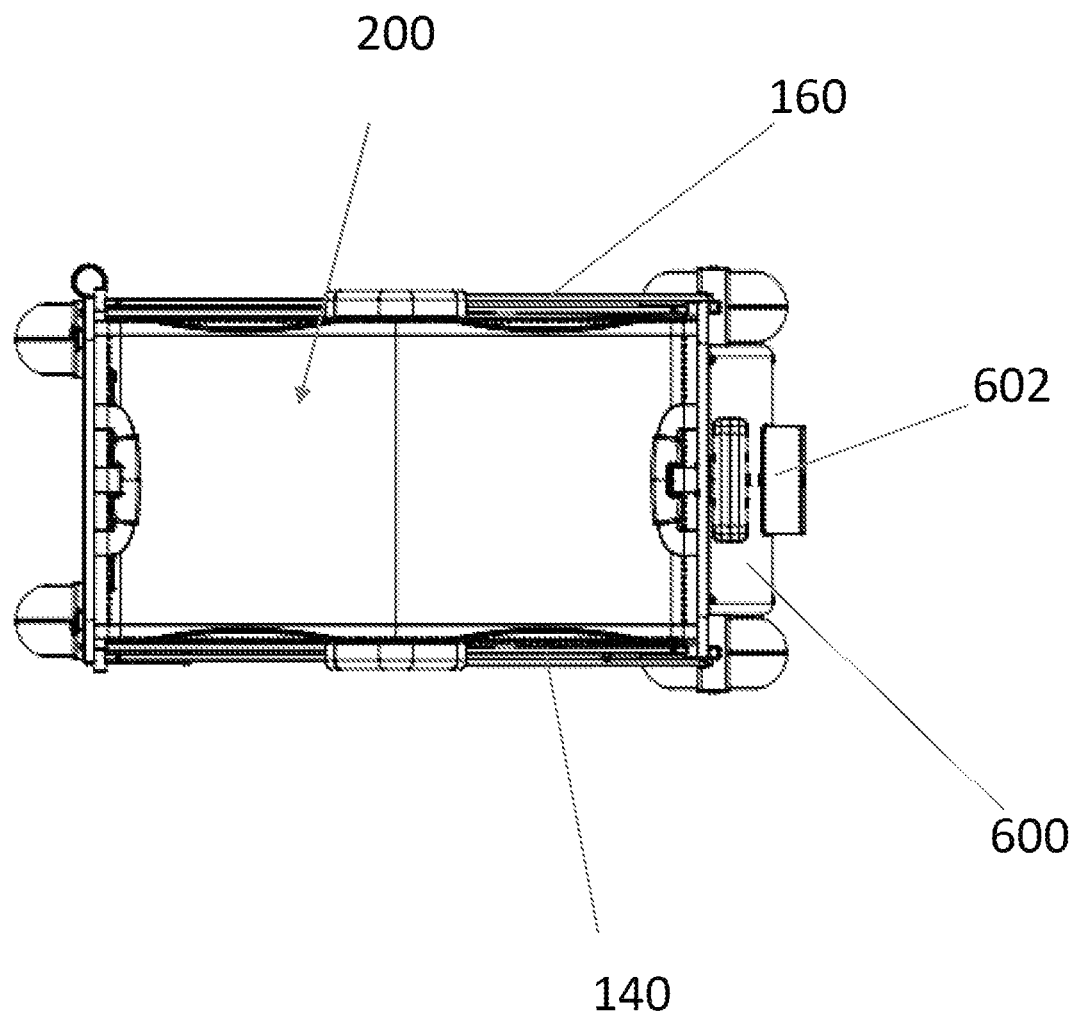
FIG. 5 illustrates a top view of the powered wagon for carrying items on sand.
Figure 6:
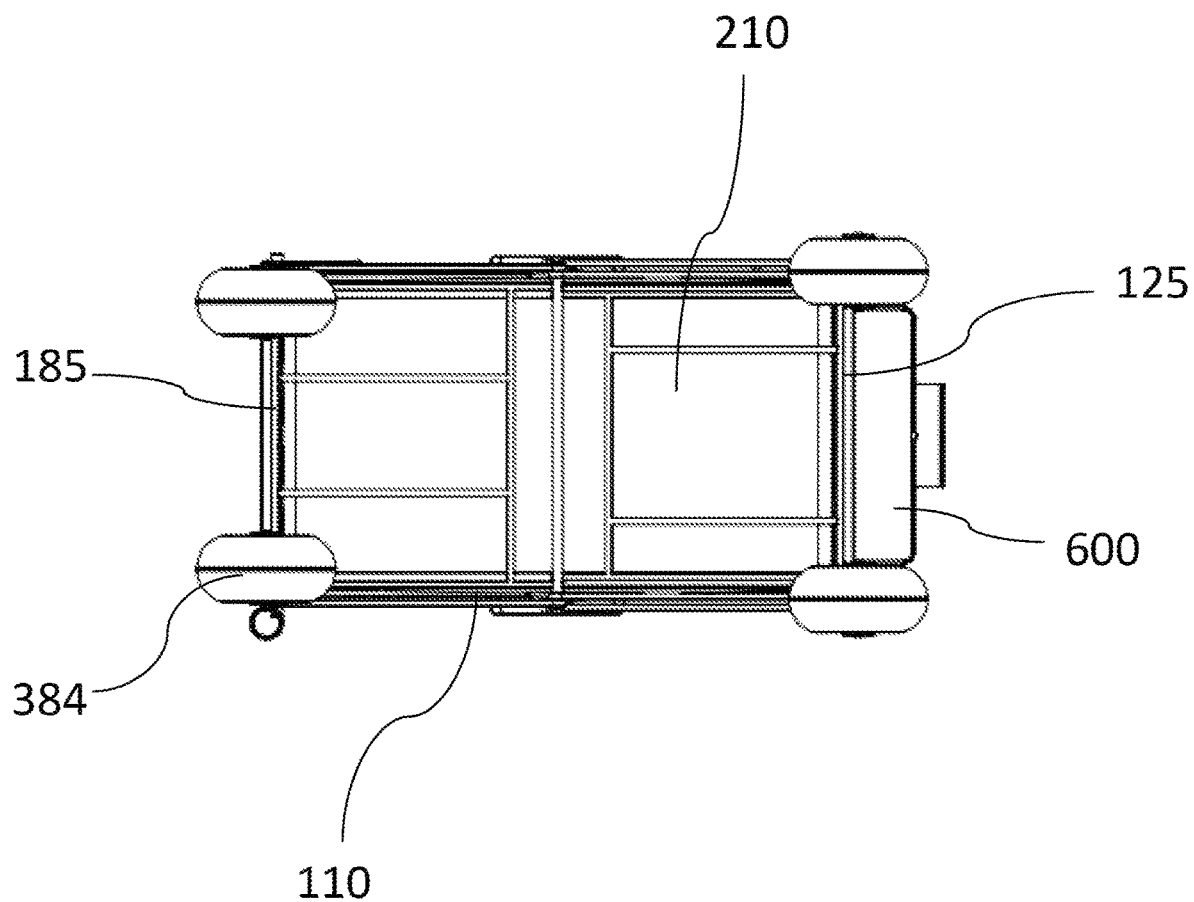
FIG. 6 illustrates a bottom view of the powered wagon for carrying items on sand.
Figure 7:
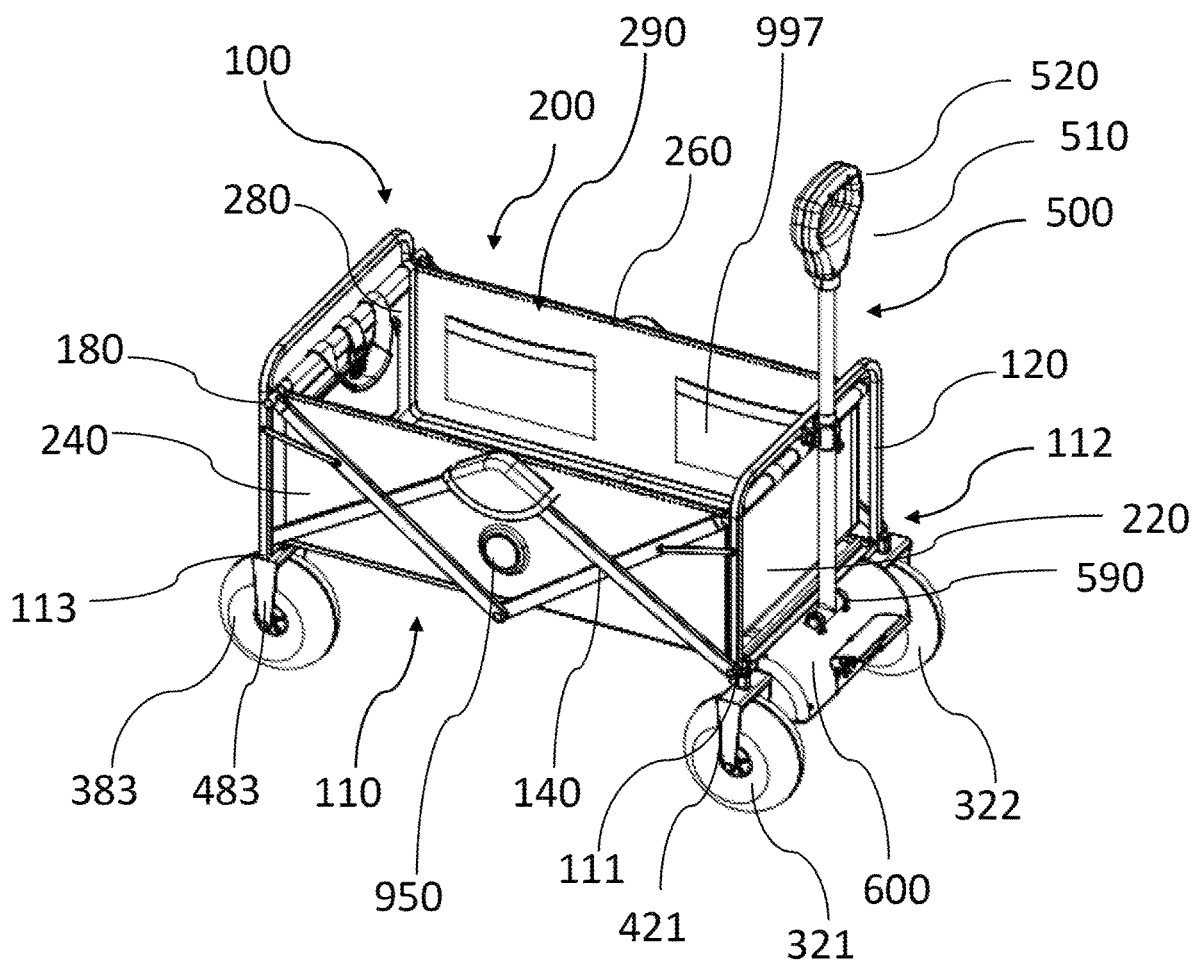
FIG. 7 illustrates a perspective view of the powered wagon for carrying items on sand or other terrain.

In this example embodiment, and referring to FIGS. 3 and 7, a handle and telescoping bar assembly 500 is pivotally coupled substantially to a housing assembly 600, the housing assembly 600 (with front cover 602) horizontally coupled to a front support bar member 125 of the bottom frame portion 110 by a distal end 590 of the handle and bar assembly, a horizontally disposed handle portion 520 defining a proximal end of the handle and telescoping bar assembly 510. A motor and shaft assembly 700 is contained within the housing assembly 600 and electronically coupled to a rechargeable battery assembly 750 and an actuator assembly 860, the motor and shaft assembly 700 rotationally coupled to front two-wheel frame assembly 320, comprised of right front wheel and axle assembly 321 and a left front wheel and axle assembly 322 (with wheel 321A and wheel 322A, respectively) of the four wheel and axle assemblies 321, 322, 383, 384 (with right back wheel 383A and left back wheel 384A, respectively). Motor and shaft assembly 700 include a drive train which includes a gear box in rotational communication with the front two-wheel frame assembly and an electric motor in rotational communication with the gear box and in electrical communication with the actuator assembly and control button assembly.

In this example embodiment, an electronic control panel 800 is communicatively coupled to a hand-held communication device 900, such as a smartphone or other smart devices, and designed for the user to remotely control any one or all of an actuator assembly 860, speed controls 872 of the motor and shaft assembly 870, and manual or automatic mode controls 880 and 882, respectively. Electronic control panel 800 includes a memory storage member and a microprocessor (not shown) operatively coupled to the radio or RF transceiver for wireless communication with the handheld communication or smart device. In a related embodiment, a security tagging member with GPS (or RFID and Bluetooth for near field communication) capabilities for tracking movement of the wagon on the handheld communication or smart device is also included. As in some smart watch technology, wagon 10 can be assigned its own cellular phone number and include a keypad to be used with a smart speaker or Bluetooth speaker on the wagon to have regular or emergency two-way communication with the user.

In one embodiment of the powered wagon 10 for carrying items on sand for a user, a control button assembly 890 is disposed on the horizontally disposed handle portion 520 of handle 520 and telescoping bar assembly 500 and designed, when activated by the user, to command the powered wagon 10 to move forward.

In one embodiment of the powered wagon 10 for carrying items on sand for a user, a Bluetooth speaker assembly 950 is disposed within the foldable, fabric container assembly 200 and is communicatively coupled to a receiver assembly 960 disposed within the housing assembly 600.

In one embodiment of the powered wagon 10 for carrying items on sand for a user, one or more horizontally disposed ring assemblies 177 are coupled to the front frame portion 120 or back frame portion 180 of the foldable frame assembly 100 and designed to support a vertically disposed pole assembly 999, which in one embodiment is an umbrella or a center post of a cabana-like assembly to expand away from the pole assembly to cover the user and guests or to support the corner of a canopy-like tent.

In one embodiment of the powered wagon for carrying items on sand for a user, a plurality of pocket members 997 is disposed on the wall portions of the foldable, fabric assembly 200. In a related embodiment, a set of outrigger hooks is located on the foldable frame assembly for supporting any one of beach chairs, beach bags and other beach accessories.

In various related embodiments, there is provided a security tagging member with GPS capabilities for tracking movement of the wagon on the handheld communication or smart device. The electronic control panel includes a charge port electrically coupled to a rechargeable battery (power source) and includes at least one USB port coupled to the rechargeable battery as a power output source. The power source in the various embodiments includes one of a rechargeable battery, non-rechargeable battery, a solar panel or a nearby alternating current (AC) power source. With respect to dealing with different types of terrain, the wheels can have a tread formation for terrain selected from the group consisting of: sand, grass, rocks, gravel dirt, snow and ice. In one example embodiment, a clear or transparent pocket on the outside of the frame assembly is used to insert a smart tablet or other smart device of viewing activities, such as sports, movies or shows for kids.

The following publications and patents are incorporated by reference in their entireties: U.S. Pat. Nos. 7,762,363; 7,963,530; 7,210,545; 8,453,771 and 9,908,570.

While the inventive concept has been described above in terms of specific embodiments, it is to be understood that the inventive concept is not limited to these disclosed embodiments. Upon reading the teachings of this disclosure, many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. A powered wagon for carrying items on sand comprising:
   a foldable frame assembly with a bottom frame portion, a front frame portion, a back frame portion, and a laterally extendable and retractable right and left sidewall portions;
   a foldable, fabric container assembly with a base portion, a front wall portion, a back wall portion, a right and left sidewall portion, and an open top portion;
   a set of four wheel and corresponding axle assemblies, each wheel and axle assembly having a substantially U-shaped wheel frame with an upper half of each wheel is disposed within the wheel frame, a front two-wheel frame assembly and a back two-wheel assembly formed from the wheel and axel assemblies, wherein the front two-wheel frame assembly is coupled to front base corners of the foldable frame assembly and the back two-wheel frame assembly is coupled to the rear base corners of the foldable frame assembly, the wheels of the back two-wheel frame assembly adapted to be inwardly and outwardly slidable along a back support bar of the bottom frame portion to facilitate nesting between the front two wheel frame assembly when the foldable frame assembly is in a retracted state;
   a handle and telescoping bar assembly pivotally coupled substantially to a housing assembly, the housing assembly horizontally coupled to a front support bar member of the bottom frame portion by a distal end of the handle and bar assembly, a horizontally disposed handle portion defining the proximal end of the handle and telescoping bar assembly;
   a motor and shaft assembly contained within the housing assembly and electrically coupled to a rechargeable battery and an actuator assembly, the motor and shaft assembly rotationally coupled to the front two-wheel frame assembly; and
   an electronic control panel communicatively coupled to a hand-held communication device and adapted for remote control of any one of: the actuator assembly, the speed of the motor and shaft assembly, and manual or automatic modes,
   wherein the foldable, fabric container assembly is removably coupled to the frame assembly and adapted to laterally extend and retract with the frame assembly, and
   wherein a Bluetooth speaker assembly is disposed within the foldable, fabric container assembly and is communicatively coupled to a receiver assembly disposed within the housing assembly.

2. The powered wagon of claim 1 wherein a control button assembly is disposed on the horizontally disposed handle portion of the handle and telescoping bar assembly and is adapted to drive the wagon forward.

3. The wagon of claim 2, wherein the motor and shaft assembly include a drive train which includes a gear box in rotational communication with the front two-wheel frame assembly and an electric motor in rotational communication with the gear box and in electrical communication with the actuator assembly and control button assembly.

4. The powered wagon of claim 1 wherein a plurality of pocket members is disposed on the wall portions of the foldable, fabric assembly.

5. The powered wagon of claim 1 wherein at least one horizontally disposed ring assembly is coupled to the front frame portion or back frame portion of the foldable frame assembly and adapted to support a vertically disposed pole assembly.

6. The wagon of claim 1, wherein the electronic control panel is electrically coupled to a power source.

7. The wagon of claim 6, wherein the power source is one of a rechargeable battery, non-rechargeable battery, a solar panel or an alternating current (AC) power source.

8. The wagon of claim 7, wherein the electronic control panel includes a charge port electrically coupled to the rechargeable battery and includes at least one USB port coupled to the rechargeable battery as a power output source.

9. The wagon of claim 1, wherein the electronic control panel includes a radio or RF transceiver for wireless communication to an external network.

10. The wagon of claim 9, wherein the electronic control panel includes a memory storage member and a microprocessor operatively coupled to the radio or RF transceiver for wireless communication with the handheld communication device.

11. The wagon of claim 10, further comprising a security tagging member with GPS capabilities for tracking movement of the wagon on the handheld communication device.

12. The wagon of claim 1, further comprising at least one wheel lock assembly located on any one of the front two-wheel frame assembly or the back two-wheel frame assembly.

13. The wagon of claim 1, further comprising a set of outrigger hooks located on the foldable frame assembly for supporting any one of beach chairs, beach bags and other beach accessories.

14. The wagon of claim 1, wherein the wheels have a diameter greater than seven (7) and a width greater than two (2) inches.

15. A self-powered wagon for transporting of personal items comprising;
a foldable frame assembly with a bottom frame portion, a front frame portion, a back frame portion, and a laterally extendable and retractable right and left sidewall portions;
a foldable, fabric container assembly with a base portion, a front wall portion, a back wall portion, a right and left sidewall portion, and an open top portion;
a front two-wheel frame assembly and a back two-wheel frame assembly, wherein the front two-wheel frame assembly is coupled to front base corners of the foldable frame assembly and the back two-wheel frame assembly is coupled to the rear base corners of the foldable frame assembly, the wheels of the back two-wheel frame assembly adapted to be inwardly and outwardly slidable along a back support bar of the bottom frame portion to facilitate nesting between the front two wheel frame assembly when the foldable frame assembly is in a retracted state;
a handle and telescoping bar assembly pivotally coupled substantially to a housing assembly, the housing assembly horizontally coupled to a front support bar member of the bottom frame portion by a distal end of the handle and bar assembly, a horizontally disposed handle portion defining the proximal end of the handle and telescoping bar assembly;
a motor and shaft assembly contained within the housing assembly and electrically coupled to a rechargeable battery and an actuator assembly, the motor and shaft assembly rotationally coupled to the front two-wheel frame assembly; and
an electronic control panel communicatively coupled to a hand-held communication device and adapted for remote control of the actuator assembly and the speed of the motor and shaft assembly, wherein the electronic control panel includes a microprocessor and memory storage and a radio for wireless communication,
wherein the foldable, fabric container assembly is removably coupled to the frame assembly and adapted to laterally extend and retract with the frame assembly, and
wherein a Bluetooth speaker assembly is disposed within the foldable, fabric container assembly and is communicatively coupled to a receiver assembly disposed within the housing assembly.

16. The wagon of claim 15, further including a security tagging member with GPS capabilities for tracking movement of the wagon on the handheld communication device.

17. The wagon of claim 15, wherein the electronic control panel includes a charge port electrically coupled to a rechargeable battery and includes at least one USB port coupled to the rechargeable battery as a power output source.

18. The wagon of claim 15, wherein the wheels have a tread formation for terrain selected from the group consisting of: sand, grass, rocks, dirt, snow and ice.

19. The wagon of claim 15, further comprising a set of outrigger hooks located on the foldable frame assembly for supporting any one of beach chairs, beach bags and other beach accessories.

* * * * *